United States Patent
Nakamura

(10) Patent No.: US 6,822,574 B2
(45) Date of Patent: Nov. 23, 2004

(54) IONOSONDE

(75) Inventor: Yoshikatsu Nakamura, Koganei (JP)

(73) Assignee: National Institute of Information and Communication Technology, Koganei (JP)

( * ) Notice: Subject to any disclaimer, the term of this patent is extended or adjusted under 35 U.S.C. 154(b) by 65 days.

(21) Appl. No.: 10/274,912

(22) Filed: Oct. 22, 2002

(65) Prior Publication Data
US 2003/0078731 A1 Apr. 24, 2003

(30) Foreign Application Priority Data
Oct. 22, 2001 (JP) .................................. 2001-324105

(51) Int. Cl.$^7$ .............................................. G01W 1/00
(52) U.S. Cl. ........................ 340/601; 702/2; 342/460
(58) Field of Search ............................ 340/601, 870.1; 702/2; 342/460, 352

(56) References Cited

U.S. PATENT DOCUMENTS

| | | | | |
|---|---|---|---|---|
| 3,618,105 A | * | 11/1971 | Bruene et al. | 343/747 |
| 4,463,357 A | * | 7/1984 | MacDoran | 342/460 |
| 4,797,677 A | * | 1/1989 | MacDoran et al. | 342/352 |
| 5,943,629 A | * | 8/1999 | Ballard et al. | 702/2 |

FOREIGN PATENT DOCUMENTS

| | | |
|---|---|---|
| JP | 48-17284 | 3/1973 |
| JP | 4-88869 | 8/1992 |

OTHER PUBLICATIONS

Klaus BIBL, et al. "The Universal Digital Ionosonde," Radio Science, vol. 13, No. 3, May–Jun. 1978, pp. 519–530.

* cited by examiner

Primary Examiner—John Tweel
(74) Attorney, Agent, or Firm—Oblon, Spivak, McClelland, Maier & Neustadt, P.C.

(57) ABSTRACT

An ionosonde includes a signal-transmitting section for transmitting to an ionosphere pulsed radio waves whose frequency is scanned; a signal-receiving section that includes a loop antenna system for measuring intensity of a magnetic field Hz of pulsed radio waves reflected by the ionosphere, a first dipole antenna system for measuring intensity of an electric field Ex orthogonal to the magnetic field Hz and a second dipole antenna system for measuring intensity of an electric field Ey orthogonal to the magnetic field Hz and electric field Ex; and a signal-processing section using values obtained at the signal-receiving section to obtain a cosine ($n_x$, $n_y$) of an arrival direction $\vec{n}$ of the reflected radio waves in accordance with relationship $n_x = (HzNx^* - ExHz^*)Z/(ExEy^* - EyEx^*)$ and relationship $n_y = (HzEy^* - EyHz^*)Z/(ExEy^* - EyEx^*)$, wherein Z stands for intrinsic impedance.

16 Claims, 3 Drawing Sheets

IONOSONDE

BACKGROUND OF THE INVENTION

1. Field of the Invention

The present invention relates to an ionosonde having a function to find the directions of arriving radio waves and particularly to an ionosonde performing direction finding based on not the directionality of an antenna, but the analysis of electric and magnetic fields of the arriving radio waves.

2. Description of the Prior Art

Ionosondes are ionospheric sounding devices that transmit to the sky pulsed radio waves whose frequencies are continuously scanned, receive on the ground the radio waves reflected by an ionosphere and prepare an ionogram showing the distribution of ionized gas based on the time of delay of the radio waves reflected by the ionosphere and returned to the ionosonde. Conventional ionosodes are not equipped with a direction-finding function having sufficient resolution, failing to obtain sufficient knowledge on the direction. For this reason, when examining the state of an ionosphere from an ionogram, analysis has been made on the assumption that radio waves transmitted to just above would be returned from just above after being reflected by the ionosphere. It has been known that this assumption is not materialized where the ionosphere is slanted or irregularly disturbed, or has a fine structure, but is correct where the ionosphere is spread flat. Where the assumption is not materialized, as described above, if the directions from which the individual pulsed radio waves transmitted to just above are returned are found, the ionogram can strictly be interpreted, enabling more exact examination of the state of the ionosphere.

In order to find the directions of the arriving radio waves with conventional ionosondes, Adcock antennas or crossed-loop antennas have been used. In short wavebands used for ionospheric observation, however, the azimuth error of the ionosonde is some tens of degrees insufficient for obtaining knowledge on the azimuth components in ionospheric distribution.

As an ionosonde having a direction-finding function is reported Digisonde in Radio Science Vol. 13, No. 3, pp 519–130, 1978. The Digisonde uses ten crossed-loop antennas to find the direction from which individually transmitted radio waves are returned. The Digisonde is similar in the aspect using loop antennas to, but different in the aspect using antenna directionality to obtain directional signals from the present invention. The azimuth resolution obtained through synthesis of the directionality of the loop antennas with the Digisonde is about 30 degrees insufficient for examining the structure of an ionosphere.

As described above, though the conventional Digisonde having a direction-finding function uses the directionality of the antenna, the azimuth resolution in the short waveband for an ionosonde is some tens of degrees insufficient for examining the ionospheric structure.

An object of the present invention is to provide an ionosonde having a direction-finding function that can observe with high-precision resolution the direction receiving the reflected waves from an ionosphere.

SUMMARY OF THE INVENTION

To attain the above object, an ionosonde according to the present invention comprises a signal-transmitting section for transmitting to an ionosphere pulsed radio waves whose frequencies are scanned; a signal-receiving section comprising a loop antenna system for measuring intensity of a magnetic field Hz of pulsed radio waves reflected by the ionosphere, a first dipole antenna system for measuring intensity of an electric field Ex orthogonal to the magnetic field Hz and a second dipole antenna system for measuring intensity of an electric field Ey orthogonal to the magnetic field Hz and electric field Ex; and a signal-processing section using three intensity values obtained at the signal-receiving section to obtain a cosine ($n_x$, $n_y$) of an arrival direction $\vec{n}$ of the reflected radio waves in accordance with relationship $n_x=(HzEx^*-ExHz^*)Z/(ExEy^*-EyEx^*)$ and relationship $n_y=(HzEy^*-EyHz^*)Z/(ExEy^*-EyEx^*)$, wherein Z stands for intrinsic impedance.

The above object can also be attained by an ionosonde comprising a signal-transmitting section for transmitting to an ionosphere pulsed radio waves whose frequencies are scanned; a signal-receiving section comprising a dipole antenna system for measuring intensity of an electric field Ez of pulsed radio waves reflected by the ionosphere, a first loop antenna system for measuring intensity of a magnetic field Hx orthogonal to the electric field Ez and a second loop antenna system for measuring intensity of a magnetic field Hy orthogonal to the electric field Ez and magnetic field Hx; and a signal-processing section using three intensity values obtained at the signal-receiving section to obtain a cosine ($n_x$, $n_y$) of an arrival direction $\vec{n}$ of the reflected radio waves in accordance with relationship $n_x=-(EzHx^*-HxEz^*)/(HxHy^*-HyHx^*)Z$ and relationship $n_y=-(EzHy^*-HyEz^*)/(HxHy^*-HyHx^*)Z$, wherein Z stands for intrinsic impedance.

In each of the ionosondes, the signal-receiving section is not less than 10 km distant from the signal-transmitting section.

In order to obtain ionograms with few noises, each of the ionosondes can further comprise a display section for displaying or accumulating three values measured in respect of electric and magnetic field intensities of the pulsed radio waves transmitted from the signal-transmitting section and then received by the signal-receiving section.

The display section also indicates the arrival directions of the reflected radio waves and at that time also displays directgrams as well as the Monograms.

The display section can display directgrams with a plurality of colors, the state of directions receiving the reflected radio waves with hues, chroma and brightness changed, and ionograms with predetermined hues, chroma and brightness.

As described above, the ionosonde of the present invention performs direction finding based on not the directionality of an antenna, but the analysis of three values (each composed of an amplitude and a phase) obtained by measurement of electric and magnetic fields of the arriving radio waves, i.e. one magnetic field in an optional direction and two electric fields orthogonal to the optional direction, or one electric field in an optional direction and two magnetic fields orthogonal to the optional direction.

The ionosphere-observing waves that are artificial radio waves generally have larger intensity and more stable phase than radio wave noise. For this reason, they have good direction precision at short wavebands, specifically a direction error as small as approximately three.

With each of the ionosondes, the display section can display ionograms and directgrams with a plurality of colors, and different hues and chroma. This enables the directions of the radio waves reflected by the ionosphere to be grasped with ease.

DESCRIPTION OF THE PREFERRED EMBODIMENT

Figure 1:
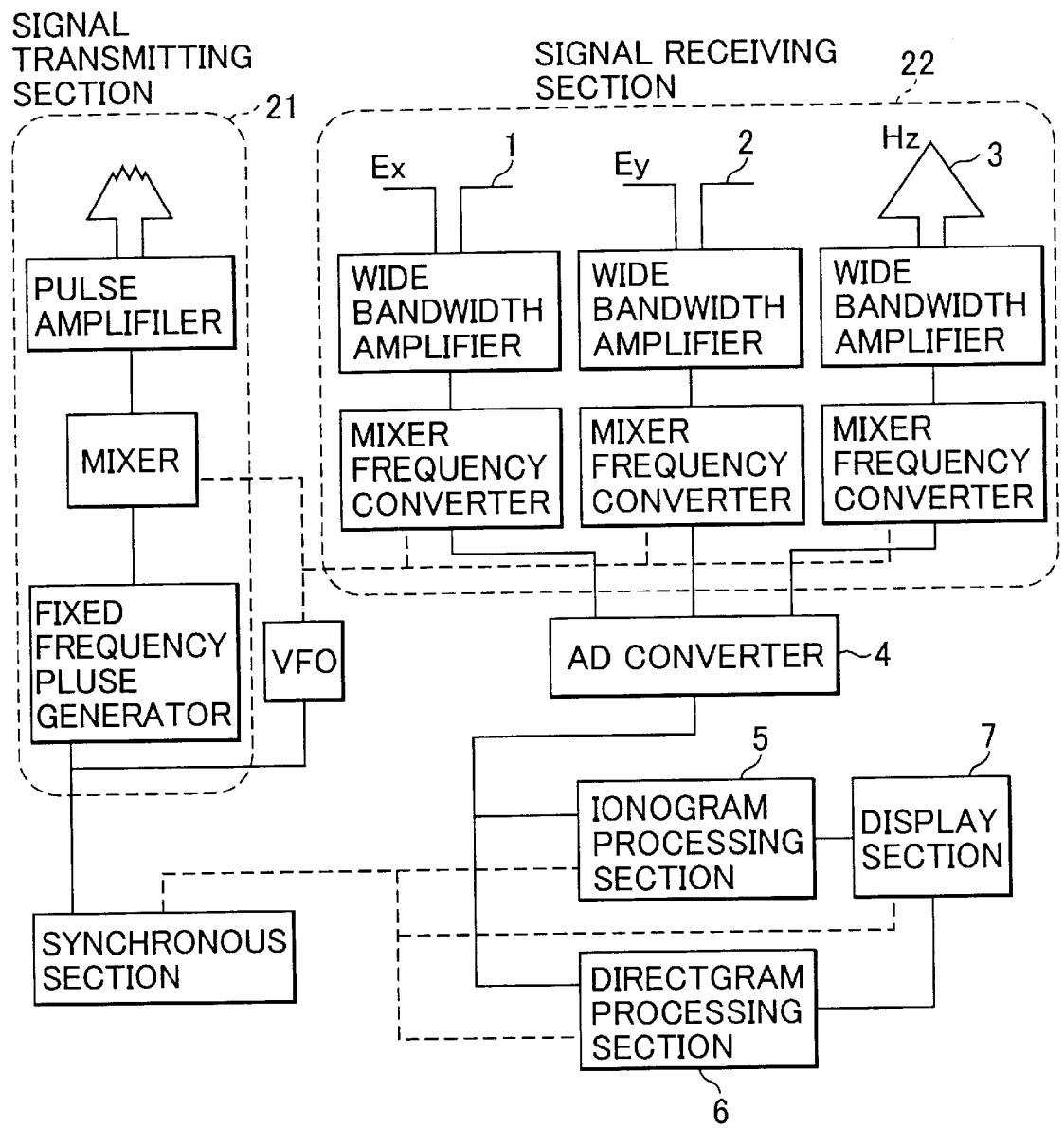
FIG. 1 is a block diagram showing the configuration of an ionosonde having two dipole antenna systems and a loop antenna system, according to the present invention.
Figure 3:
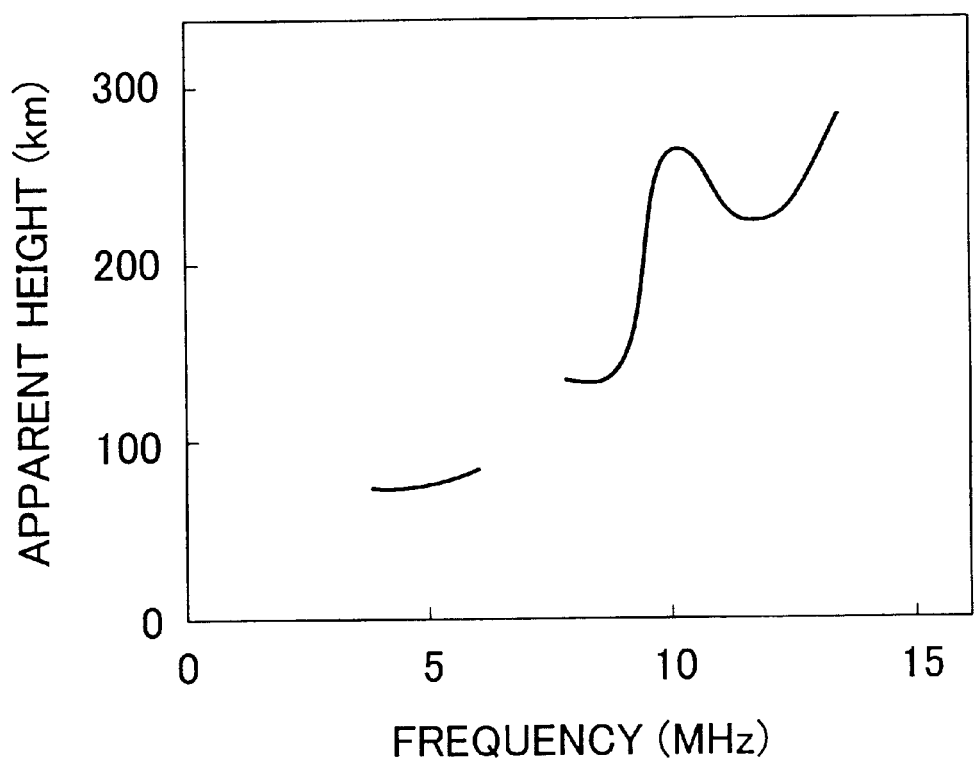
FIG. 3 is a view showing one example of an ionogram.

The first embodiment of the ionosonde according to the present invention will be described in detail with reference to FIG. 1. The ionosonde shown in FIG. 1 comprises a signal-transmitting section 21 for transmitting pulsed radio waves whose frequencies are scanned and a signal-receiving section 22 for receiving the transmitted pulsed radio waves. The signal-receiving section 22 includes a signal-receiving system having a substantially vertical loop antenna 3 that receives radio waves having the same frequency as the pulsed radio waves and two signal-receiving systems having two dipole antennas 1 and 2 orthogonal to each other within a plane parallel to the loop antenna plane. With the three signal-receiving antenna systems, the intensity of a substantially horizontal magnetic field Hz of the arriving radio waves and the intensities of the electric fields Ex and Ey orthogonal to each other and to the magnetic field Hz are measured. The directions receiving the radio waves are calculated from the three measurement values each consisting of an amplitude and phase. The antennas 1, 2 and 3 receive the radio waves and output three of the six components of the electric and magnetic fields of the radio waves each comprising a (x, y, z) component. The output signals are amplified with wide bandwidth amplifiers, the amplified signals are mixed with signals from a local oscillator that is a variable frequency oscillator (VFO) using mixer circuits and converted into intermediate frequency signals of approximately 2 MHz. The converted signals are further converted into signals having a frequency bandwidth of around 10 to 50 kHz. The resultant three component signals are AD-converted by simultaneous sampling with an AD converting section 4 into digital signals. An ionogram is produced from the intensities of the digital signals consisting of three components at an ionogram-processing section 5 and transmitted to a display section 7. The "ionogram" used herein is the data observed with an ionosonde, as shown in FIG. 3. The data is obtained by transmitting to the sky pulsed radio waves whose frequencies are scanned, receiving on the ground pulsed radio waves reflected by an ionosphere and measuring an apparent height of the ionosphere from the delay of time.

At a directgram-processing section 6, the values of the three components are respectively subjected to fast Fourier transform (FFT) and, after being subjected to amendment of fluctuations in amplitude and phase of the measured values obtained in advance by measurement or calculation, the directions receiving the reflected waves are calculated to produce a directgram. The directgram thus produced is transmitted to the display section 7. The "directgram" used herein is a diagram obtained by projecting the intensities of the reflected radio waves on a height-constant coordinate plane having its original point just above an observation point at which the ionosonde is installed and in the directions receiving the radio waves reflected by the ionosphere as viewed from the observation point. The display section displays both the ionogram and the directgram at the same time, and accumulates and stores data. The FFT transform and amendment performed at the directgram-processing section 6 may be done at part of the AD converter 4.

While in this embodiment the surface of the loop antenna is disposed substantially vertical for receiving radio waves from above, it is better that both the loop antenna surface and the y-axis are slanted by 30 degrees so that dextrorotation-polarized wave and levorotation-polarized wave can be distinguished with ease by the signals received by the vertical dipole antenna when producing an ionogram and that the antenna 2 receiving the electric field Ey is disposed so as to have sensitivity to the horizontal electric field.

The field intensity of the arriving radio waves is obtained from an electric signal output by using a calculated input impedance value, though the electric signal output generally differs depending on the kind of antennas from the field intensity of the arriving radio waves. In addition, by receiving a radio wave signal and obtaining the relationship between an output of an electric signal from an antenna and the electric or magnetic field intensity of the signal, a calibration factor can be obtained with ease. It is easy to obtain the electric or magnetic field intensity of the arriving radio waves from the electric signal output from the antenna using the calibration factor.

The direction of the arriving radio waves can be obtained from the thus obtained electric and magnetic field intensities of the arriving radio waves in the following manner. To be specific, taking $\vec{n}$ as a unit vector in the arrival direction of the arriving radio waves, $\vec{E}$ as an entire electric field vector of the radio waves, $\vec{H}$ as an entire magnetic field vector of the radio waves and Z as intrinsic impedance of the radio waves in the air, Equation (1) relating to the arrival direction $\vec{n}$ of the arriving radio waves can be obtained from the generally known orthogonal relationship between the advancing direction (−n) of the radio waves and the electric field E and magnetic field H.

$$\vec{n} = (n_x, n_y) \tag{1}$$

$$\vec{H} = \frac{\vec{E} \times \vec{n}}{Z}$$

When the conjugate complex numbers of Hz, Ex and Ey are expressed as Hz*, Ex* and Ey*, respectively, Equations 2A and 2B can be obtained from Equation (1) with ease.

$$H_z = \frac{-n_x E_y + n_y E_x}{Z} \tag{2A}$$

$$H_z^* = \frac{-n_x E_y^* + n_y E_x^*}{Z} \tag{2B}$$

Since the radio waves reflected by the ionosphere are elliptically polarized waves, Equations (2A) and (2B) differ from each other.

From Equations (2A) and (2B), Equation (3) with x and y components of the direction of the arriving radio waves is obtained.

$$n_x = \frac{H_z E_x^* - E_x H_z^*}{E_x E_y^* - E_y E_x^*} Z \tag{3}$$

-continued $$n_y = \frac{H_z E_y^* - E_y H_z^*}{E_x E_y^* - E_y E_x^*} Z$$

Equation (3) can also be expressed as Equation (4) when the absolute values of Hz, Ex and Ey are |Hz|, |Ex| and |Ey|; the phase difference between Hz and Ey is δzx; the phase difference between Hz and Ey is δzy; and the phase difference between Ex and Ey is δxy.

$$n_x = \frac{|H_z|\sin\delta_{zx}}{|E_y|\sin\delta_{xy}} Z \tag{4}$$

$$n_y = \frac{|H_z|\sin\delta_{zy}}{|E_x|\sin\delta_{xy}} Z$$

When θ is the angle of the arriving radio waves measured from the z-axis and φ is the angle of the arriving radio waves measured in the counterclockwise direction from the x-axis on the x-y plane, θ and φ can be obtained from Equation (5).

$$\theta = \arcsin\sqrt{(n_x^2 + n_y^2)} \tag{5}$$

$$\phi = \arctan\left(\frac{n_y}{n_x}\right)$$

Thus, the direction of the arriving radio waves can be obtained from the substantially horizontal magnetic field Hz, substantially horizontal electric field Ex orthogonal to the magnetic field Hz and substantially vertical electric field Ey orthogonal both to the magnetic field Hz and to the electric field Ex. In addition, since the above method is not the one for obtaining the azimuth of arriving radio waves using the directionality of an antenna, it does not require use of an antenna synchronous with arriving radio waves. A small-sized dipole antenna can be used instead. In major cases, conventional ionosondes use a large-sized loop antenna substantially vertical to a signal-receiving antenna. This loop antenna and two small-sized dipole antennas can constitute a direction-finding antenna system with ease.

Figure 2:
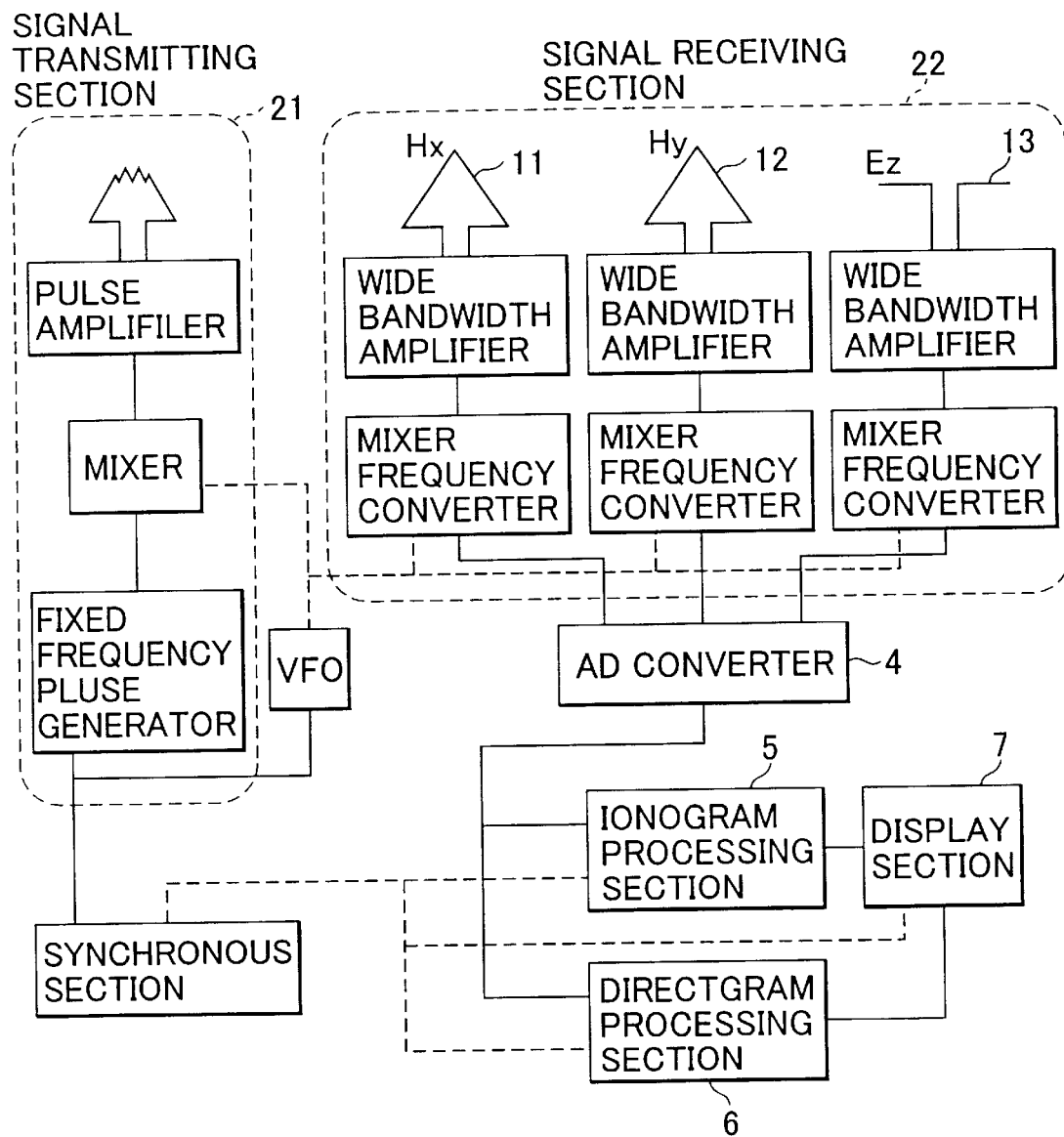
FIG. 2 is a block diagram showing the configuration of an ionosonde having a dipole antenna system and two loop antenna systems, according to the present invention.

The second embodiment of the direction-finding ionosonde is shown in FIG. 2. It has a signal-receiving section 22 that comprises a signal-receiving system having a dipole antenna 13 for receiving pulsed radio waves whose frequencies are scanned, and two signal-receiving systems, one of which has a loop antenna 11 and the other of which has a loop antenna 12. With the three antenna systems, the intensity of the electric field Ex in the direction substantially vertical to the arriving radio waves, the intensity of the substantially horizontal magnetic field Hx orthogonal to the electric field Ex and the intensity of the magnetic field Hy orthogonal both to the electric field Ex and to the magnetic field Hy are measured. The direction of the arriving radio waves can be obtained from the three measured values each composed of amplitude and phase in the following manner.

Taking $\vec{n}$ as a unit vector in the direction of the arriving radio waves, $\vec{E}$ as an entire electric field vector of the radio waves, $\vec{H}$ as an entire magnetic field vector of the radio waves and Z as intrinsic impedance of the radio waves in the air, Equation (1) can be expressed as Equation (6).

$$\vec{n} = (n_x, n_y) \tag{6}$$

-continued $$\vec{E} = \vec{n} \times \vec{H} Z$$

When the conjugate complex numbers of Hz, Ex and Ey are expressed as Hz*, Ex* and Ey*, respectively, Equations 7A and 7B can be obtained from Equation (6) with ease.

$$E_z = (n_x H_y - n_y H_x) Z \tag{7A}$$

$$E_z^* = (n_x H_y^* - n_y H_x^*) Z \tag{7B}$$

Since the radio waves reflected by the ionosphere are elliptically polarized waves, Equations (7A) and (7B) differ from each other.

From Equations (7A) and (7B), Equation (8) with x and y components of the direction of the arriving radio waves is obtained.

$$n_x = \frac{-1}{Z} \times \frac{E_z H_x^* - H_x E_z^*}{H_x H_y^* - H_y H_x^*} \tag{8}$$

$$n_y = \frac{-1}{Z} \times \frac{E_z H_y^* - H_y E_z^*}{H_x H_y^* - H_y H_x^*}$$

Equation (8) can also be expressed as Equation (9) when the absolute values of Ez, Hx and Hy are |Ez|, |Hx| and |Hy|; the phase difference between Ez and Hx is δzx; the phase difference between Ez and Hy is δzy; and the phase difference between Hx and Hy is δxy.

$$n_x = \frac{-1}{Z} \times \frac{|E_z|\sin\delta_{zx}}{|H_y|\sin\delta_{xy}} \tag{9}$$

$$n_y = \frac{-1}{Z} \times \frac{|E_z|\sin\delta_{zy}}{|H_x|\sin\delta_{xy}}$$

Thus, the direction of the arriving radio waves can be obtained from the substantially horizontal magnetic field Hx, substantially horizontal magnetic field Hy orthogonal to the magnetic field Hx and substantially vertical electric field Ez orthogonal both to the magnetic field Hz and to the electric field Ex. With this method, the direction finding can also be performed, with the z-axis slanted from the vertical direction so as to increase the sensitivity of a dipole antenna to the radio waves arriving from above, and with the dipole antenna slanted from the vertical.

Since the above direction-finding method is not for obtaining the azimuth of the arriving radio waves using the directionality of an antenna, it does not require use of an antenna synchronous with the arriving radio waves. A small-sized dipole antenna can be used instead. In major cases, conventional ionosondes use a large-sized loop antenna substantially vertical to a signal-receiving antenna. This loop antenna, a small-sized dipole antenna and a small-sized loop antenna can constitute a direction-finding antenna system with ease.

Desirable arrangement using one dipole antenna and two loop antennas of the same size is such that the loop antennas are disposed with their loop surfaces being orthogonal and their centers being coincident and such that the dipole antenna is disposed as dose to the loop antennas as possible, but as separated from the loop antennas to an extent that the loop antennas do not disturb the electric field. When a large-sized loop antenna and a small-sized loop antenna are used, it is desired that a small-sized dipole antenna and the small-sized loop antenna be disposed as separated from the large-sized loop antenna to an extent that the large-sized loop antenna does not disturb the magnetic and electric fields.

In the ionosonde of the present invention, a modified antenna can be used instead of the aforementioned dipole antenna when receiving the electric field. Similarly, in place of the aforementioned loop antenna, a modified antenna can also be used for receiving the magnetic field.

As described in the foregoing, the ionosonde of the present invention is not for direction finding based on the directionality of an antenna, but has a function to find the direction based on the analysis of three measured values each including the amplitude and phase of a magnetic field of arriving radio waves in an optional direction and two electric fields orthogonal to the magnetic field or of an electric field of arriving radio waves in an optional direction and two magnetic fields orthogonal to the electric field.

The ionosphere-observing waves that are artificial radio waves generally have large intensity and stable phase. For this reason, they have good direction precision at short wavebands, specifically a direction error as small as approximately three.

In the ionosonde of the present invention, since three measurement values can be obtained per unit standardizing time of the received radio waves, a linear formula (electromagnetic field intensity) of the three measurement values, a linear formula of square (electromagnetic field energy intensity) of the three measurement values and a function of the three measurement values are used to give intensity to ionograms and properly select the ionograms, thereby enabling an ionogram with a good S/N ratio to be obtained.

The ionosonde of the present invention can be used as a grazing incidence observation apparatus enabling an ionosphere far from the head of an operator to be effectively observed if the signal-transmitting section is not less than 10 km distant from the signal-receiving section, radio waves are transmitted in an oblique direction from the normal of the ground surface, and radio waves reflected by the ionosphere are incident on the antenna of the signal-receiving section in a slanting direction.

When displaying the arriving direction data obtained by the ionosonde of the present invention on the display section, displaying of the directgram and ionogram overlapped with or dose to each other enables the state of the ionosphere to be dearly grasped.

Directgrams with a plurality of colors can be displayed, with the hues, chroma and brightness changed in accordance with the frequencies and polarized waves. This facilitates distinguishability of changes in arriving azimuth. In addition, when displaying a colored trace of an ionogram, the relationship between the ionogram data and the arriving azimuth can be made dearer. Display of an ionogram and directgram with symbols and/or letters can also be attained.

Use of the ionosonde thus configured enables the arriving directions of radio waves reflected by the ionosphere to be calculated from the electromagnetic field components. Therefore, individual arriving directions of the radio waves reflected by the ionosphere can be measured with high precision without relying on the directionality of an antenna.

Furthermore, the directgrams and ionograms obtained can effectively be displayed in colors as described above, resulting in ready grasp of the arrving directions of the radio waves reflected by the ionosphere.

The ionosonde according to the present invention is configured so that the signal-receiving section is equipped with an antenna that measures magnetic field intensity and an antenna that receives electric field intensity, thereby receiving three components of the electric field and magnetic field of the radio waves and obtaining the arriving directions of the radio waves reflected by the ionosphere from calculation of the three components. Therefore, it is possible to obtain the azimuth of the arriving radio waves with much higher precision as compared with conventional ionosondes having a direction-finding function.

The ionosonde of the present invention can perform grazing incidence observation, with an appropriate distance left between the signal-transmitting section and the signal-receiving section, thereby enabling the ionosphere far from the head of an operation to be effectively observed.

Furthermore, since the three values measured at the signal-receiving section can be displayed and accumulated at the display section, ionograms with few noises can be obtained with ease.

Moreover, the display section can display an ionogram and a directgram in combination, with the hues, chroma and brightness changed. Therefore, it is possible to easily distinguish changes in arriving direction resulting from frequencies and polarized waves.

What is claimed is:

1. An ionosonde comprising:
   a signal-transmitting section configured to transmit to an ionosphere pulsed radio waves whose frequency is scanned;
   a signal-receiving section comprising a loop antenna system configured to measure intensity of a magnetic field Hz of pulsed radio waves reflected by the ionosphere, a first dipole antenna system configured to measure an intensity of an electric field Ex orthogonal to the magnetic field Hz and a second dipole antenna system configured to measure an intensity of an electric field Ey orthogonal to the magnetic field Hz and electric field Ex; and
   a signal-processing section configured to use three intensity values obtained at the signal-receiving section to obtain a cosine ($n_x$, $n_y$) of an arrival direction $\vec{n}$ of the reflected radio waves in accordance with relationship $n_x = (HzEx^* - ExHz^*)Z/(ExEy^* - EyEx^*)$ and relationship $n_y = (HzEy^* - EyHz^*)Z/(ExEy^* - EyEx^*)$, wherein Z stands for intrinsic impedance, and $Ex^*$, $Hz^*$, and $Ey^*$ are the conjugate complex numbers of Ex, Hz, and Ey, respectively.

2. An ionosonde comprising:
   a signal-transmitting section configured to transmit to an ionosphere pulsed radio waves whose frequency is scanned;
   a signal-receiving section comprising a dipole antenna system configured to measure an intensity of an electric field Ez of pulsed radio waves reflected by the ionosphere, a first loop antenna system configured to measure an intensity of a magnetic field Hx orthogonal to the electric field Ez and a second loop antenna system configured to measure an intensity of a magnetic field Hy orthogonal to the electric field Ez and magnetic field Hx; and
   a signal-processing section configured to use three intensity values obtained at the signal-receiving section to obtain a cosine ($n_x$, $n_y$) of an arrival direction $\vec{n}$ of the reflected radio waves in accordance with relationship $n_x = -(EzHx^* - HxEz^*)/(HxHy^* - HyHx^*)Z$ and relationship $n_y = -(EzHy^* - HyEz^*)/(HxHy^* - HyHx^*)Z$, wherein Z stands for intrinsic impedance, and $Hx^*$, $Ez^*$, and $Hy^*$ are the conjugate complex numbers of Hx, Ez, and Hy, respectively.

3. The ionosonde according to claim 1, wherein the signal-receiving section is not less than 10 km distant from the signal-transmitting section.

4. The ionosonde according to claim 2, wherein the signal-receiving section is not less than 10 km distant from the signal-transmitting section.

5. The ionosonde according to claim 1, further comprising a display section configured to display or accumulate three values measured in respect of electric and magnetic field intensities of the pulsed radio waves transmitted from the signal-transmitting section and then received by the signal-receiving section.

6. The ionosonde according to claim 2, further comprising a display section configured to display or accumulate three values measured in respect of electric and magnetic field intensities of the pulsed radio waves transmitted from the signal-transmitting section and then received by the signal-receiving section.

7. The ionosonde according to claim 5, wherein the display section also indicates the directions receiving the reflected radio waves and at that time also displays directgrams as well as the ionograms.

8. The ionosonde according to claim 6, wherein the display section also indicates the directions receiving the reflected radio waves and at that time also displays directgrams as well as the ionograms.

9. The ionosonde according to claim 5, wherein the display section can display directgrams with a plurality of colors, the state of directions receiving the reflected radio waves with hues, chroma and brightness changed, and ionograms with predetermined hues, chroma and brightness.

10. The ionosonde according to claim 6, wherein the display section can display directgrams with a plurality of colors, the state of directions receiving the reflected radio waves with hues, chroma and brightness changed, and ionograms with predetermined hues, chroma and brightness.

11. The ionosonde according to claim 7, wherein the display section can display directgrams with a plurality of colors, the state of directions receiving the reflected radio waves with hues, chroma and brightness changed, and ionograms with predetermined hues, chroma and brightness.

12. The ionosonde according to claim 8, wherein the display section can display directgrams with a plurality of colors, the state of directions receiving the reflected radio waves with hues, chroma and brightness changed, and ionograms with predetermined hues, chroma and brightness.

13. An ionosonde comprising:
   a signal-transmitting section configured to transmit to a ionosphere pulsed radio waves whose frequencies are scanned;
   a signal-receiving section comprising at least one loop antenna system configured to measure a magnetic field intensity of the transmitted radio waves reflected by the ionosphere and two dipole antenna systems each configured to measure an electric field intensity of the reflected radio waves, or at least one dipole antenna system and two loop antenna systems; and
   a signal-processing section configured to use three intensity values obtained at the dipole antenna and loop antenna systems as well as an intrinsic impedance to obtain a cosine of a direction receiving the reflected radio waves.

14. The ionosonde according to claim 13, wherein the signal-receiving section comprises a loop antenna system configured to measure an intensity of a magnetic field Hz of pulsed radio waves reflected by the ionosphere, a first dipole antenna system configured to measure an intensity of an electric field Ex orthogonal to the magnetic field Hz and a second dipole antenna system configured to measure an intensity of an electric field Ey orthogonal to the magnetic field Hz and electric field Ex.

15. The ionosonde according to claim 13, wherein the signal-receiving section comprises a dipole antenna system configured to measure an intensity of an electric field Ez of pulsed radio waves reflected by the ionosphere, a first loop antenna system configured to measure an intensity of a magnetic field Hx orthogonal to the electric field Ez and a second loop antenna system configured to measure an intensity of a magnetic field Hy orthogonal to the electric field Ez and magnetic field Hx.

16. The ionosonde according to claim 13, wherein the signal-receiving section is not less than 10 km distant from the signal-transmitting section.

* * * * *